United States Patent [19]

Isomura et al.

[11] Patent Number: 5,356,578
[45] Date of Patent: Oct. 18, 1994

[54] MOLD FOR SLIP CASTING AND METHOD OF SLIP CASTING

[75] Inventors: Keiichiro Isomura; Toshihiko Funahashi; Ryojo Uchimura, all of Chiba; Kazuki Ogasahara, Chiyoda, all of Japan

[73] Assignee: Kawasaki Steel Corporation, Kobe, Japan

[21] Appl. No.: 2,948

[22] Filed: Jan. 11, 1993

Related U.S. Application Data

[63] Continuation-in-part of Ser. No. 474,082, Apr. 12, 1990, abandoned.

[30] Foreign Application Priority Data

Aug. 8, 1988 [JP] Japan .................. 63-250843
Sep. 12, 1988 [JP] Japan .................. 63-226351

[51] Int. Cl.$^5$ .............................. B28B 1/26
[52] U.S. Cl. ...................... 264/42; 249/113; 249/134; 249/141; 264/86; 264/87; 264/219; 264/337; 425/84; 425/85; 501/96
[58] Field of Search ............... 249/134, 141, 113; 264/86, 87, 42, 43, 60, 63, 65, 337, 338, 219; 425/812, 84, 85; 501/96-98

[56] References Cited

U.S. PATENT DOCUMENTS

| | | |
|---|---|---|
| 2,809,898 | 10/1957 | Thiess . |
| 3,468,992 | 9/1969 | Lubatti et al. .................. 264/60 |
| 3,720,740 | 3/1973 | Muta et al. ...................... 264/65 |
| 3,993,495 | 11/1976 | Galliath et al. . |
| 4,017,319 | 4/1977 | Greskovich et al. .............. 264/65 X |
| 4,540,677 | 9/1985 | Enomoto et al. ................. 264/60 X |
| 4,595,545 | 6/1986 | Sane . |
| 4,642,298 | 2/1987 | Kuramoto et al. ............... 264/60 X |
| 4,795,723 | 1/1989 | Nishikawa et al. .............. 264/65 X |
| 4,874,304 | 10/1989 | Ito et al. . |
| 4,904,625 | 2/1990 | Shaffer . |
| 4,908,172 | 3/1990 | Sterzel et al. . |
| 4,960,734 | 10/1990 | Karai et al. ...................... 264/65 X |
| 4,997,605 | 3/1991 | Shaffer ............................... 264/65 |
| 5,139,719 | 8/1992 | Winder ............................. 264/65 |
| 5,187,128 | 2/1993 | White et al. ..................... 264/65 X |

FOREIGN PATENT DOCUMENTS

| | | |
|---|---|---|
| 3516587 | 10/1985 | Fed. Rep. of Germany . |
| 49-53216 | 5/1974 | Japan . |
| 60-166405 | 8/1985 | Japan . |
| 62-140803 | 6/1987 | Japan . |
| 63-45104 | 2/1988 | Japan . |
| WO8801258 | 2/1988 | PCT Int'l Appl. . |

*Primary Examiner*—Karen Aftergut
*Attorney, Agent, or Firm*—Oliff & Berridge

[57] ABSTRACT

A mold for molding an industrial product from a powder by slip casting, which has good water-absorptivity, long life, high strength and excellent mold-releasability and is constituted from a composite base material of boron nitride and other ceramic constituents. With this mold, molding of ceramic products and the like can be performed with high efficiency without causing clogging.

2 Claims, 3 Drawing Sheets

MOLD FOR SLIP CASTING AND METHOD OF SLIP CASTING

This application is a continuation-in-part of U.S. Ser. No. 07/474,082 filed Apr. 12, 1990, now abandoned.

FIELD OF TECHNOLOGY

The present invention relates to a mold for slip casting having fine pores and exhibiting good water-absorptivity, long durability, high strength and excellent mold-releasability and a method of slip casting by using this mold.

BACKGROUND TECHNOLOGY

Slip casting is a kind of molding technique of powders applied, in particular, to the field of ceramics and employed from old in potteries for sanitation fixtures, chinas, porcelains and the like. In recent years, this technique is applied also to the field of fine ceramics using alumina ($Al_2O_3$), silicon nitride ($Si_3N_4$) and the like and is expected to be a molding technique of parts for industrial use.

Gypsum molds known from the oldest time are conventional as a mold for slip casting. The reason therefor include excellent water-absorptivity, mold-releasability and dimensional accuracy as well as the shapeability of large and complicated forms at low cost.

On the other side, however, gypsum molds are poor in the water resistance, compressive strength and abrasion resistance and have a defect that the $Ca^{2+}$ ions in the gypsum are dissolved out to enter the ceramic body. In addition, gypsum molds have a problem that the porosity and pore diameter distribution differ from mold to mold to cause variation in the water absorptivity so that definite molding conditions cannot be undertaken. When the mold is used in molding under pressurization in order to increase the productivity, furthermore, the strength is insufficient and a defect is caused that a large number of the molds must be used in parallel.

Standing on such a background, a variety of molds of other materials are under development with an object to overcome the defective points of gypsum molds. Major materials include resins, composite materials of a resin and a ceramic, composite materials of a metal and a ceramic, metals and the like. (Yoichi Motoki, "Manufacturing Process of Ceramics" published Oct. 10, 1978 by Gihodo Publishing; official publication of Japanese Patent Kokai 60-66405; and official publication of Japanese Patent Kokai 49-53216).

These molds, however, have the following defective points. (1) The pore diameter is larger than 3 $\mu m$ so that clogging takes place on the mold when fine particles are subjected to slip casting.

(2) The mold-releasability between the mold and the ceramic body is poor so that compulsory mold-takeoff must be undertaken by passing a gas and other means sometimes to cause damage on the molded body. When polyvalent cations highly ion-exchangeable, such as $Ca^{2+}$ ions, are incorporated into the surface of the mold in order to improve the mold-releasability, they enter the ceramic body.

(3) Fabrication of the mold is not an easy matter and the working cost is high to impart full accuracy to the surface of the product or to finish a product of a complicated configuration having an extremely thin-walled portion or an extremely narrow portion with a good dimensional accuracy.

SUMMARY OF THE INVENTION

The present invention has an object to solve the above described problems in gypsum molds and other molds.

The present invention consists in providing a mold for slip casting having the characteristics shown below and a method of slip casting by using this mold:

(1) having fine pore diameters free from clogging even in the use of an ultra-fine powder for fine ceramics;

(2) being a mold of long durability having excellent water resistance and compressive strength without causing denaturation or wearing by abrasion of the surface of the mold even after many uses;

(3) being a mold of high strength suitable not only for molding under normal pressure but also molding under pressurization; and (4) further, being a mold having good mold releasability exhibiting little wettability with ceramic bodies.

The present invention is a mold for slip casting constructed from boron nitride (BN) and one kind or at least two kinds of other ceramic constituents and having air permeability. The method of the present invention is a method for slip casting comprising preparation of a slip and pouring this slip into the above mentioned mold to deposit and form a wall layer. In the above mentioned mold, it is preferable that the weight proportion of the BN based on the total weight of the BN and other ceramic constituents is from 10 to 50%, average pore diameter is from 0.1 to 2 $\mu m$ and porosity is from 10 to 40%.

DETAILED DESCRIPTION OF PREFERRED EMBODIMENT

The present inventors have made comparisons and studies of various materials as a mold for slip casting which is one of the principal methods of molding of a powder. As a result, they arrived at a discovery that a mold for slip casting having very superior characteristics not known in the prior art can be obtained by using a composite sintered body composed of boron nitride and other ceramic constituents leading to completion of the present invention.

The present inventors firstly conducted studies of the material of the mold. The guide line is to select the material from ceramics in view of the abrasion resistance and compressive strength.

BN has come to their attention as the base in respect of the little wettability with the ceramic body and good workability. A problem in BN, however, is that BN is hardly sinterable to be sintered usually by the HP method and the abrasion resistance is low.

The present inventors accordingly have come to an idea to combine BN with other ceramic constituents capable of being sintered densely by heating under normal pressure or under pressurized atmosphere and having excellent abrasion resistance and compressive strength. The intention therein consists in the synergistic effect given below.

(1) BN inhibits sintering of other ceramics and pores are formed thereby in the sintered article.

(2) The abrasion resistance is supplemented while the advantages of BN are utilized.

Incidentally, the above mentioned pores must be open pores making communication between the inner and outer surfaces of the mold in order to ensure sufficient water absorptivity of the mold and the mold must have air permeability.

In the following, description is given with reference to the experiments of the present invention by using BN and $Si_3N_4$ as the other ceramic.

The $Si_3N_4$ used as the starting material was a powder having an average particle diameter of 0.8 $\mu$m and the proportion of the $\alpha$-phase of 93% and the BN used as the starting material was a powder having an average particle diameter of 0.2 $\mu$m and a purity of 97%.

Figure 1:
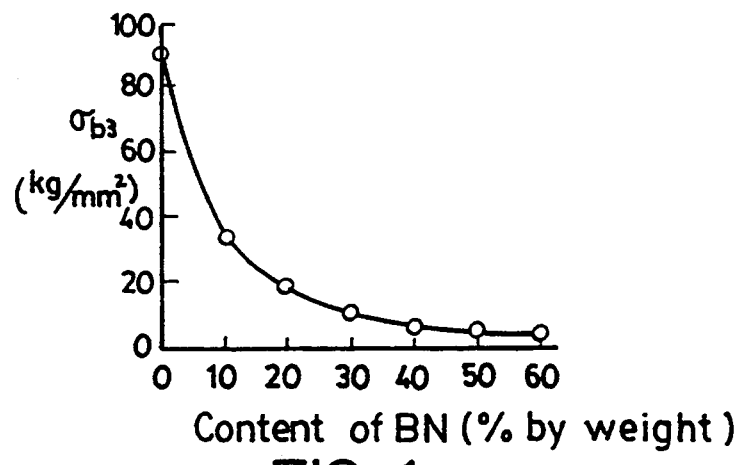
FIG. 1 is a graph showing the dependency of the three-point bending strength of $Si_3N_4$-BN type composite sintered bodies at room temperature on the content of BN.
Figure 2:
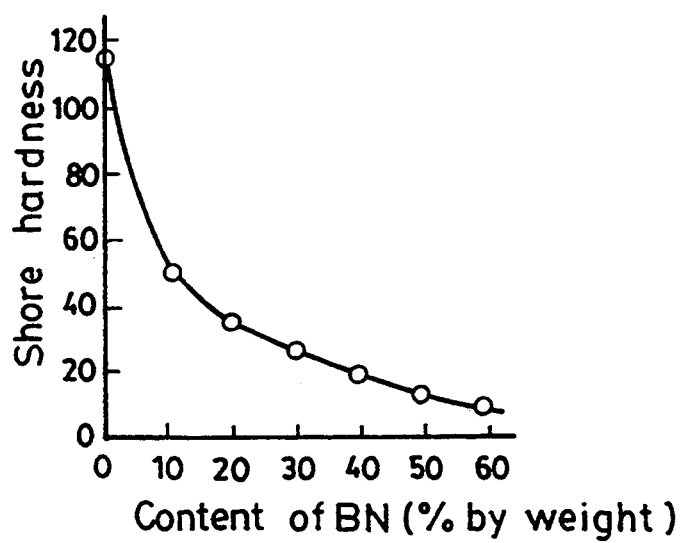
FIG. 2 is a graph showing the dependency of the Shore hardness of the above mentioned sintered bodies on the content of BN.
Figure 3:
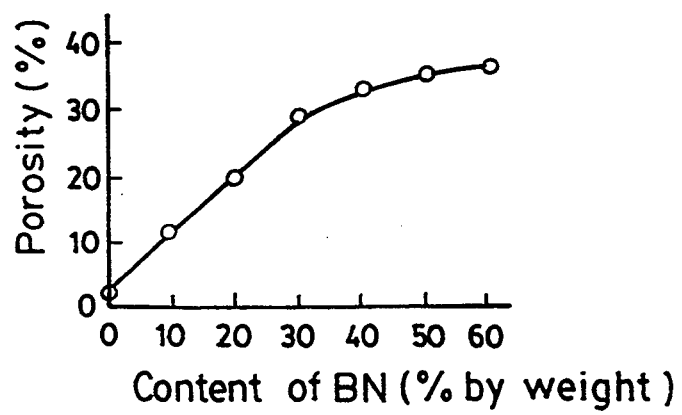
FIG. 3 is a graph showing the dependency of the porosity of the above mentioned sintered bodies on the content of BN.
Figure 4:
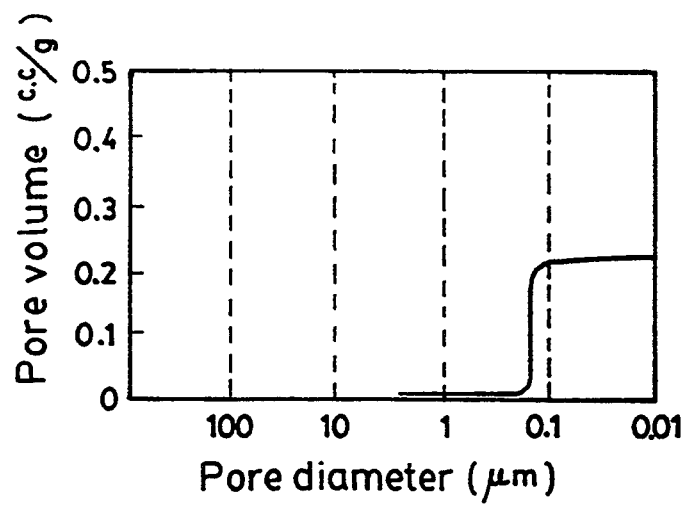
FIGS. 4(a) and (b) are each a graph showing the pore diameter distribution of the $Si_3N_4$-BN type composite sintered bodies with a BN content of 20 and 50% by weight, respectively.
Figure 4:
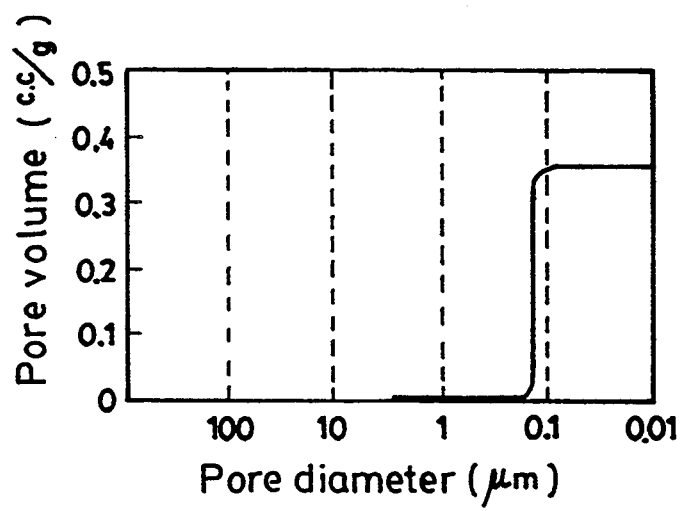

These two kinds of powders (including a sintering aid of $Si_3N_4$) were mixed together in a ball mill using ethanol and, after drying, shaped by slip casting into a test piece having a length of 50 mm, width of 50 mm and thickness of 10 mm. This shaped body was sintered in $N_2$ under 9 atm. at 800° C. The weight proportion of $Si_3N_4$ and BN was varied as $Si_3N_4/BN=100/0$, 90/10, 80/20, 70/30, 60/40, 50/50 and 40/60. These sintered bodies were evaluated for various properties. FIG. 1, FIG. 2 and FIG. 3 each show the dependency of the three-point bending strength ($\sigma_{b3}$), Shore hardness and porosity, respectively, on the content of BN. FIGS. 4 show the pore diameter distribution in the sintered bodies of 20% by weight BN content in (a) and of 50% by weight BN content in (b).

From the results of FIG. 1 to FIG. 4, increase in the content of BN results in an increase of the porosity though with a decrease in the strength and hardness as a mold. It is also understood that the pore diameter is independent on the content of BN with an average pore diameter of about 0.2 $\mu$m in a very sharp distribution zone. It is presumable that BN inhibits sintering of $Si_3N_4$ and the degree of inhibition is increased with an increase in the content of BN. The compressive strength is also a sufficiently high strength as compared with the strength of gypsum molds of 10 to 50 kg/cm$_2$ so that molding can be performed not only under normal pressure but also under pressurization.

Furthermore, the pore diameter is very fine and the distribution thereof is sharp so that the mold can be estimated to have sufficient and uniform water absorptivity. It is presumable that the pore diameter can be so small because the starting materials are fine particles.

It is expected from the above described test piece experiments that, by using a mold of the present invention, no clogging takes place even in slip casting by using fine particles with good mold-releasability and molding can be performed under a considerably high pressure to enhance the mass-productivity. It is possible thereby to use the same for products under high requirements for qualities such as, for example, automobile parts.

Usable other ceramic constituents to be combined with BN include, in addition to $Si_3N_4$, those materials having excellent anti-abrasion characteristics such as, for example, SiC, Sialon, $ZrO_2$, $Al_2O_3$, AlN, mullite and the like. The effect of composite forming of each of them with BN was similar to $Si_3N_4$. It is the same when two kinds or more of the materials, such as $Al_2O_3$-$ZrO_2$, are combined according to the object. Furthermore, the pore diameter and porosity can be freely controlled by means of the particle size and contents of the starting materials so that the particle size and contents of the materials for molding should be adjusted. The content of BN should be freely selected depending on the material to be molded since an increase in BN decreases the compressive strength and hardness though with improvements in the mold-releasability and workability.

The present inventors accordingly prepared two kinds of slips (A) and (B) as follows to examine the performance of the mold according to the present invention.

(A) a slip for fine ceramic having a viscosity of about 500 cps obtained by mixing 100 parts by weight of alumina of 0.8 $\mu$m (A1160SG-4, manufactured by Showa Denko) as the starting material and 25 parts by weight of water followed by adjustment of the viscosity using a polycarboxylic acid as a deflocculating agent. (B) a slip for pottery having a viscosity of about 1000 cps obtained by mixing 60 parts by weight of a pottery material composed of 50% by weight of pottery stone, 25% by weight of clay and 25% by weight of feldspar, having a particle size constitution of 50% under 10 $\mu$m, as the starting material and 40 parts by weight of water followed by controlling of the viscosity with water glass as a deflocculating agent.

These slips were each molded under normal pressure (P=0 kg/cm$_2$) or under pressurization (P=10 or 20 kg/cm$_2$) by using an $Si_3N_4$-BN mold sintered in the same manner as described above (a bottomed cylindrical form having an inner diameter of 40 mm, depth of 100 mm and wall thickness of 40 mm) to evaluate the moldability such as the velocity of wall deposition and the like. Various results of the test are shown in Table 1. The abrasive wearing of the mold is shown by the abraded amount after 50 times of testing.

And, similar tests were undertaken of the mold of the present invention in which the weight proportion of $Si_3N_4/BN$ was 70/30 and the average pore diameter was varied by the changes in the particle diameter of the BN. The results are shown in Table 2.

It was understood from these results that a content of BN should be selected so as to give a remarkable improvement in the mass-productivity by pressurization and to give the highest mold-releasability and abrasion resistance. Further, the mass-productivity can be improved by supplying the slip under pressurization. The mass-productivity can be improved by increasing the content of BN as a consequence of the increase in the porosity.

Incidentally, a difficulty is caused in mold-releasing when the weight proportion of BN is smaller than 10% while the abrasion resistance would be poor when it exceeds 50%.

Further, the molding velocity would be too low when the average particle diameter is smaller than 0.1 μm and, when it is larger than 2 ∥ m, there appears a tendency that clogging takes place. Furthermore, the molding velocity would be too low when the porosity is smaller than 10% and, when it is larger than 40%, the strength of the mold would be insufficient.

In the next place, the products can be molded with high efficiency by the slip casting method using the mold of the present invention.

Figure 5:
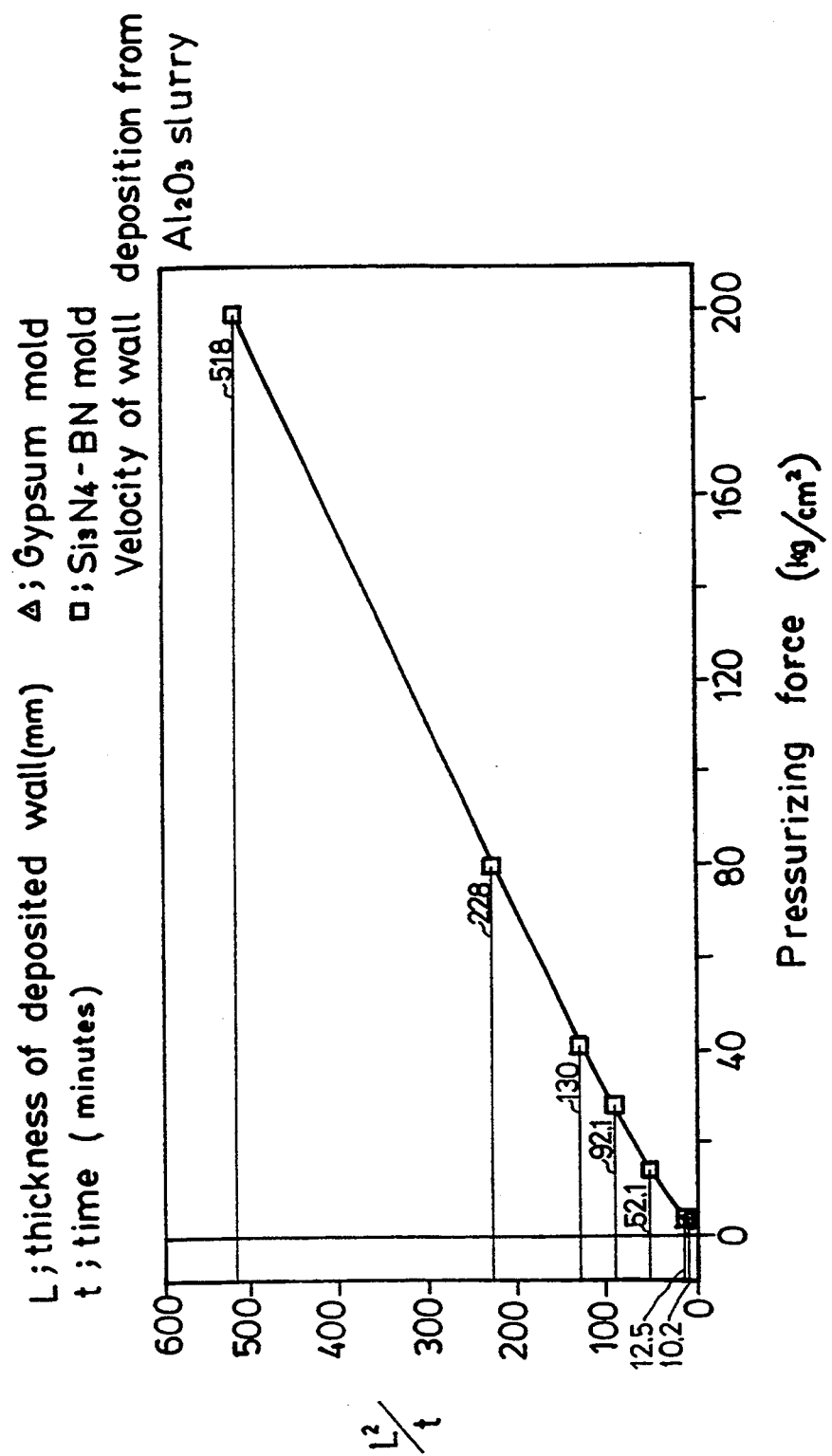
FIG. 5 is a graph showing the relationship between the pressure and the velocity of wall deposition in slip casting when the mold according to the present invention is used.

It is known that the velocity of wall deposition of a slip in a mold is given by the relationship of the following equation assuming no changes of the slip in the lapse of time:

$$L^2/t = k$$

where L is the thickness of the deposited wall (mm); t is the time (minutes); and k is a constant.

k in the above equation is called the coefficient of wall-deposition velocity. According to the studies of the inventors, it has been found that the value of this k is approximately proportional to the pressurizing force p on the slurry when a mold of $Si_3N_4$-BN is used. FIG. 5 is a graph showing this fact.

FIG. 5 illustrates an example in which an $Al_2O_3$ slurry was subjected to slip casting by using a mold of $Si_3N_4$-BN type ($Si_3N_4$:BN=70:30 and particle diameter of BN 0.5 μm). The velocity of wall deposition is greatly increased by increasing the pressurizing force on the slurry. Consequently, the efficiency of molding of the products can be greatly enhanced. When the strength of the mold is taken into consideration, incidentally, it is a fair assumption that the process can be run even under a still higher pressure of, for example, 500 kg/$cm_2$ or higher.

Conventional gypsum molds are destroyed when the pressurizing force of the slurry exceeds 10 kg/$cm_2$ so that a pressurizing force of high pressure cannot be applied.

As compared therewith, accordingly, high-pressure, high-efficiency operation can be performed by the slip casting method using the mold of the present invention.

An important aspect of the features of the inventive BN base mold exists in having a highly smooth surface configuration with a very small roughness. A surface roughness is evaluated by a centerline average roughness Ra.

Sampling a length L of a measuring part along the direction of the centerline of a roughness curve, assuming the sampled centerline as an x-axis, and the direction of vertical magnification as a y-axis, and representing the roughness curve as y=f(x), then the centerline average roughness Ra in micron units is defined as follows:

Measuring length should usually be performed three times or more of cut off values in the curve. The measurement is carried out using a contact needle roughness meter.

The inventive mold has a very smooth surface where Ra is not larger than 3 μm though it varies according to the size and other features of the raw powder employed. For instance, in the case of $Si_3N_4$-BN base mold shown in Table 2, the centerline average roughness Ra are 0.5 μm and 2.5 ∥ m, respectively, in accordance with BN powders of average grain sizes 0.2 μm and 2.5 μm. Incidentally, Ra values were 3.5 for a gypsum mold and 9.2 μm for an epoxy resin mold, respectively. For an epoxy resin mold, a surface becomes remarkably rough because rough aggregates of 5~10 μm are employed.

A merit obtained by using such mold with a smooth surface in the present invention is to get a sintered ceramic body having a very smooth surface as well as a smoothly formed cast product which surface is copied from the mold.

A final ceramic sintered body manufactured with a conventional gypsum mold or an epoxy resin mold has to have a ground surface for sales products. Products obtained with the inventive BN base mold have superior surface characteristics without grinding.

Further, the inventive mold may maintain its smooth surface unchanged after many slip casting procedures as a result of having better anti-abrasive features as compared with a gypsum or an epoxy resin mold.

EXAMPLE 1

In the following, a description is given with reference to the examples of the present invention.

As the mold according to the present invention, molds were prepared in such compositions of SiC-BN, $ZrO_2$-BN, $Al_2O_3$-BN, mullite-BN, Sialon-BN and $Al_2O_3$-$ZrO_2$-BN (weight proportion of $Al_2O_3$/$ZrO_2$=80/20) that the content of BN in each was 30% in a weight proportion. As the comparative examples, gypsum molds and epoxy resin molds were prepared. The configuration of the molds was the same as described above and the various properties are shown in Table 3.

Slip casting of the products was performed by using the above described $Al_2O_3$slip under normal pressure and under pressurization of 10 or 20 kg/$cm^2$. The test was repeated 50 times and the results are shown in Table 4.

As is clear from the results in Table 4, the molds of the present invention were satisfactory in all of the items. In contrast thereto, clogging rapidly takes place in the epoxy resin molds and the mass-productivity of the gypsum molds is low with the molding pressure limited to 10 kg/$cm^2$ along with rapid abrasive wearing.

$$Ra = \frac{1}{L} \int_0^L |f(x)| dx$$

TABLE 1

| $Si_3N_4$/BN | | 95/5 | 90/10 | 80/20 | 70/30 | 60/40 | 50/50 | 40/60 | 30/70 |
| --- | --- | --- | --- | --- | --- | --- | --- | --- | --- |
| | | | | Slip A used | | | | | |
| Velocity of wall | P = 0 | 0.4 | 0.9 | 1.2 | 1.2 | 1.2 | 1.4 | 1.6 | 1.5 |
| deposition | P = 10 | 0.7 | 1.6 | 6.4 | 8.1 | 10 | 11.5 | 12.2 | 12.8 |
| (mm/minute) | P = 20 | 1 | 1.8 | 12.1 | 14.4 | 16.9 | 17.8 | 18.4 | 19.8 |
| (P = kg/$cm^2$) | | | | | | | | | |
| Clogging | | no | no | no | no | no | no | no | no |

TABLE 1-continued

| Si₃N₄/BN | | 95/5 | 90/10 | 80/20 | 70/30 | 60/40 | 50/50 | 40/60 | 30/70 |
|---|---|---|---|---|---|---|---|---|---|
| Mold-releasability | | adhesion | slight adhesion | good | good | good | good | good | good |
| Abrassive wearing of mold (mm) | | no | no | no | no | no | 0.2 | 0.4 | 0.7 |
| Porosity (%) | | 6 | 14 | 22 | 30 | 35 | 38 | 41 | 43 |
| Slip B used | | | | | | | | | |
| Velocity of wall | P = 0 | 0.9 | 2.1 | 2.4 | 2.7 | 2.5 | 2.9 | 3.3 | 3.2 |
| deposition | P = 10 | 1.5 | 3.3 | 13.7 | 18.1 | 22.5 | 25.1 | 26.3 | 25.5 |
| (mm/minute) | P = 20 | 3.1 | 6.4 | 25.3 | 35.1 | 45.1 | 53.5 | 59.3 | 59.9 |
| P = kg/cm² | | | | | | | | | |
| Clogging | | no | no | no | no | no | no | no | no |
| Mold-releasability | | slight adhesion | good | good | good | good | good | good | good |
| Abrasive wearing of mold (mm) | | no | no | no | no | no | 0.2 | 0.5 | 0.8 |
| Porosity (%) | | 6 | 14 | 22 | 30 | 35 | 38 | 41 | 43 |

TABLE 2

| Particle diameter of BN (μm) | | 0.1 | 0.2 | 0.5 | 2.5 | 7.0 | 10.0 |
|---|---|---|---|---|---|---|---|
| Slip A used | | | | | | | |
| Velocity of wall | p = 0 | 0.7 | 1.1 | 1.2 | 1.0 | 0.9 | 0.8 |
| deposition | P = 10 | 3.0 | 7.5 | 8.1 | 4.0 | 3.0 | 2.0 |
| (mm/minute) | P = 20 | 6.0 | 13.8 | 14.4 | 7.5 | 6.0 | 4.0 |
| (P = kg/cm²) | | | | | | | |
| Clogging | | no | no | no | no | yes | yes |
| Mold-releasability | | good | good | good | good | good | slight adhestion |
| Abrasive wearing of mold (mm) | | no | no | no | no | no | no |
| Porosity (%) | | 29 | 30 | 30 | 32 | 34 | 36 |
| Average pore diameter (μm) | | 0.08 | 0.1 | 0.25 | 0.5 | 2 | 3 |
| Slip B used | | | | | | | |
| Velocity of wall | p = 0 | 1.7 | 2.5 | 2.7 | 1.8 | 1.5 | 1.4 |
| deposition | P = 10 | 8.8 | 16.8 | 18.1 | 9.8 | 7.8 | 6.9 |
| (mm/minute) | P = 20 | 17.4 | 30.0 | 35.1 | 19.8 | 15.6 | 13.2 |
| (P = kg/(cm²) | | | | | | | |
| Clogging | | no | no | no | no | no | yes |
| Mold-releasability | | good | good | good | good | good | slight adhesion |
| Abrasive wearing of mold (mm) | | no | no | no | no | no | no |
| Porosity (%) | | 29 | 30 | 30 | 32 | 34 | 36 |
| Average pore diameter (μm) | | 0.08 | 0.1 | 0.25 | 0.5 | 2 | 3 |

TABLE 3

| Composition | Three-point bending strength (σb₃) (kg/mm²) | Porosity | Shore hardness | Average pore diameter (μm) |
|---|---|---|---|---|
| SiC—BN | 12.3 | 32.5 | 26.1 | 0.18 |
| ZrO₂—BN | 18.7 | 29.6 | 20.2 | 0.37 |
| Al₂O₃—BN | 1.2 | 32.7 | 23.1 | 0.45 |
| Mullite-BN | 1.9 | 30.5 | 22.2 | 0.51 |
| SIALON-BN | 11.5 | 31.5 | 27.2 | 0.21 |
| Al₂O₃—ZrO₂—BN | 9.7 | 29.2 | 22.8 | 0.40 |
| Gypsum | 0.4 | 45.1 | 15.1 | 2.1 |
| Epoxy resin | 1.2 | 38.0 | 28.0 | 5.6 |

TABLE 4

| Composition | | SiC—BN | ZrO₂—BN | Al₂O₃—BN | Mullite-BN | SIALON-BN | Al₂O₃—ZrO₂—BN | Gypsum | Epoxy resin |
|---|---|---|---|---|---|---|---|---|---|
| Velocity of wall deposition (mm/minute) (P = kg/cm²) | P = 0 | 1.1 | 2.6 | 2.9 | 3.0 | 1.2 | 2.7 | 4.9 | 1.9 |
| | 10 | 7.2 | 9.4 | 12.1 | 12.3 | 8.1 | 11.1 | 14.4 | 40.0 |
| | 20 | 11.5 | 17.6 | 22.2 | 24.6 | 14.4 | 19.6 | — | 62.5 |
| Clogging | | no | no | no | no | no | no | no # | bad clogging limit of use with n = 20 |
| Mold-releasability | | good | good | good | good | good | good | good | strong adhesion |
| Abrasive wearing | | no | no | no | no | no | no | 0.9 mm | no |

TABLE 4-continued

| Composition | Sic—BN | $ZrO_2$—BN | $Al_2O_3$—BN | Mullite-BN | SIALON-BN | $Al_2O_3$—$ZrO_2$—BN | Gypsum | Epoxy resin |
|---|---|---|---|---|---|---|---|---|
| of mold (mm) | | | | | | | lost at n = 50 | |

Re-deposition on to the body as $Ca^{2+}$ explains absence of clogging in gypsum mold.
n: number of testing

EXAMPLE 2

In the following, description is given of the examples of the slip casting method of the present invention.

Conditions of the slip casting are as follows:

Mold of example:
  Material: $Si_3N_4$-BN based mold ($Si_3N_4$:BN=70:30)
  Dimensions: 20 mm diameter × 100 mm length Mold of comparative example:
  Material: 2 kinds including gypsum and epoxy resin
  Dimensions: the same as in the example Molding materials:
  (1) Base material of pottery (pottery stone 50% by weight; clay: 25% by weight; feldspar 25% by weight)
  (2) $Al_2O_3$ (average particle diameter 0.8 μm)
  (3) $Si_3N_4$ (average particle diameter 0.8 μm)

Molding pressure: 10, 50, 100 and 200 kg/cm²

Firing conditions of molded body:
  Potteries: 1300° C., in air
  $Al_2O_3$: 1600° C., in air
  $Si_3N_4$: 1800° C., 9 kg/cm² in $N_2$ Table 5 to Table 7 show the mold-releasability, surface condition and bulk density of the molded bodies. The bulk density and three-point bending strength were measured of the sintered bodies obtained by firing under the respective conditions necessary to effect sintering and the moldability in slip casting was evaluated for the respective molds. The results of the evaluation are shown also in Table 5 to Table 7.

As is clear from the results in Table 5 to Table 7, molded bodies having good surface condition without defects could be obtained in a high efficiency by conducting molding of slip casting using a mold of an $Si_3N_4$-BN type sintered body of the present invention. The results of the bulk density of the molded body and the bulk density and bending strength of the sintered body were at least equivalent to the products by a gypsum mold and epoxy resin mold.

TABLE 5

| Materials | | | Base material of pottery (pottery stone: 50% by weight; clay: 25% by weight; feldspar: 25% by weight) | | | | |
|---|---|---|---|---|---|---|---|
| Mold | | | Gypsum mold | | | | |
| Pressure (kg/cm²) | | | 0 | 10 | 50 | | |
| Item of evaluation | Molded body | Mold-releasability | good | | — | | |
| | | Bulk density (g/cm³) (% of theoretical density) | 1.61 (—) | 1.7 (—) | — | | |
| | | Surface condition | Appearance of irregularity with increase of number of casting | | — | | |
| | Sintered body | Bulk density (g/cm³) (% of theoretical density) | 2.62 (—) | 2.74 (—) | — | | |
| | | Three-point bending strength (kg/mm²) | 6.2 | 7.1 | — | | |
| | Abrasive wearing of mold | | Remarkable after 50 times | | — | | |
| | Others | | Mold destroyed when pressure 10> kg/cm² | | | | |
| Mold | | | Epoxy resin mold | | | | |
| Pressure (kg/cm²) | | | 0 | 10 | 50 | 100 | 200 |
| Item of evaluation | Molded body | Mold-releasability | not good enough (cracks formed in some molded bodies) | | | | |
| | | Bulk density (g/cm³) (% of theoretical density) | 1.5 (—) | 1.65 (—) | 1.70 (—) | 1.71 (—) | 1.72 (—) |
| | | Surface condition | irregularity due to poor mold-releasability | | | | |
| | Sintered body | Bulk density (g/cm³) (% of theoretical density) | 2.73 (—) | 2.74 (—) | 2.85 (—) | 2.84 (—) | 2.85 (—) |
| | | Three-point bending strength (kg/mm²) | 6.0 | 6.5 | 7.0 | 7.0 | 7.1 |
| | Abrasive wearing of mold | | no | | | | |
| | Others | | Clogging occurred at pressure >100 kg/cm² | | | | |
| Mold | | | $Si_3N_4$—BN mold ($Si_3N_4$:BN = 70:30) | | | | |
| Pressure (kg/cm²) | | | 0 | 10 | 50 | 100 | 200 |
| Item of evaluation | Molded body | Mold-releasability | | | good | | |
| | | Bulk density (g/cm³) (% of theoretical density | 1.67 (—) | 1.72 (—) | 1.80 (—) | 1.81 | 1.81 |
| | | Surface condition | | | good | | |
| | Sintered | Bulk density (g/cm³) | 2.72 | 2.81 | 2.92 | 2.93 | 2.94 |

TABLE 5-continued

| Materials | | | Base material of pottery (pottery stone: 50% by weight; clay: 25% by weight; feldspar: 25% by weight) | | | | |
|---|---|---|---|---|---|---|---|
| | body | (% of theoretical density) | (—) | (—) | (—) | (—) | (—) |
| | | Three-point bending strength (kg/mm$^2$) | 6.6 | 7.2 | 7.5 | 7.6 | 7.8 |
| | Abrasive wearing of mold | | no | | | | |
| | Others | | no clogging | | | | |

Firing conditions: pottery, 1300° C., in air

TABLE 6

| Materials | | | Al$_2$O$_3$ (Average particle diameter 0.8 μm) | | | | |
|---|---|---|---|---|---|---|---|
| Mold | | | Gypsum mold | | | | |
| Pressure (kg/cm$^2$) | | | 0 | 10 | 50 | | |
| Item of evaluation | Molded body | Mold-releasability | good | | — | | |
| | | Bulk density (g/cm$^3$) | 2.51 | 2.55 | — | | |
| | | (% of theoretical density) | (63) | (64) | | | |
| | | Surface condition | Appearance of irregularity with increase of number of casting | | — | | |
| | Sintered body | Bulk density (g/cm$^3$) | 3.78 | 3.79 | — | | |
| | | (% of theoretical density) | (95) | (95) | | | |
| | | Three-point bending strength (kg/mm$^2$) | 31 | 33 | — | | |
| | Abrasive wearing of mold | | Remarkable after 30 times | | — | | |
| | Others | | Mold destroyed when pressure 10> kg/cm$^2$ | | | | |
| Mold | | | Epoxy resin mold | | | | |
| Pressure (kg/cm$^2$) | | | 0 | 10 | 50 | 100 | 200 |
| Item of evaluation | Molded body | Mold-releasability | not good enough (cracks formed in some molded bodies) | | | | |
| | | Bulk density (g/cm$^3$) | 2.51 | 2.56 | 2.62 | 2.63 | 2.63 |
| | | (% of theoretical density) | (63) | (64) | (66) | (66) | (66) |
| | | Surface condition | irregularity due to poor mold-releasability | | | | |
| | Sintered body | Bulk density (g/cm$^3$) | 3.78 | 3.80 | 3.90 | 3.91 | 3.92 |
| | | (% of theoretical density) | (95) | (95) | (99) | (98) | (98) |
| | | Three-point bending strength (kg/mm$^2$) | 33 | 34 | 40 | | |
| | Abrasive wearing of mold | | no | | | | |
| | Others | | Clogging occurred at pressure >50 kg/cm$^2$ | | | | |
| Mold | | | Si$_3$N$_4$—BN mold (Si$_3$N$_4$:BN = 70:30) | | | | |
| Pressure (kg/cm$^2$) | | | 0 | 10 | 50 | 100 | 200 |
| Item of evaluation | Molded body | Mold-releasability | | | good | | |
| | | Bulk density (g/cm$^3$) | 2.53 | 2.60 | 2.63 | 2.63 | 2.64 |
| | | (% of theoretical density) | (64) | (65) | (66) | (66) | (66) |
| | | Surface condition | | | good | | |
| | Sintered body | Bulk density (g/cm$^3$) | 3.81 | 3.85 | 3.95 | 3.95 | 3.96 |
| | | (% of theoretical density) | (96) | (97) | (99) | (99) | (99) |
| | | Three-point bending strength (kg/mm$^2$) | 34 | 35 | 43 | | |
| | Abrasive wearing of mold | | no | | | | |
| | Others | | no clogging | | | | |

Firing conditions: Al$_2$O$_3$, 1600° C. in air

TABLE 7

| Materials | | | Si$_3$N$_4$ (Average particle diameter 0.8 μm) | | |
|---|---|---|---|---|---|
| Mold | | | Gypsum mold | | |
| Pressure (kg/cm$^2$) | | | 0 | 10 | 50 |
| Item of evaluation | Molded body | Mold-releasability | | good | — |
| | | Bulk density (g/cm$^3$) | 2.13 | 2.15 | — |
| | | (% of theoretical density) | (65) | (65) | |

TABLE 7-continued

| Materials | | | Si₃N₄ (Average particle diameter 0.8 μm) | | | | |
|---|---|---|---|---|---|---|---|
| | Sintered body | Surface condition | Appearance of irregularity with increase of number of casting | | | — | |
| | | Bulk density (g/cm³) | 3.18 | 3.19 | | — | |
| | | (% of theoretical density) | (97) | (97) | | — | |
| | | Three-point bending strength (kg/mm²) | 85 | 87 | | — | |
| | Abrasive wearing of mold | | Remarkable after 30 times | | | — | |
| | Others | | Mold destroyed when pressure 10> kg/cm² | | | | |
| Mold Pressure (kg/cm²) | | | Epoxy resin mold | | | | |
| | | | 0 | 10 | 50 | 100 | 200 |
| Item of evaluation | Molded body | Mold-releasability | not good enough (cracks formed in some molded bodies) | | | | |
| | | Bulk density (g/cm³) | 2.13 | 2.17 | 2.21 | 2.21 | 2.22 |
| | | (% of theoretical density) | (65) | (66) | (67) | (67) | (67) |
| | | Surface condition | irregularity due to poor mold-releasability | | | | |
| | Sintered body | Bulk density (g/cm³) | 3.19 | 3.20 | 3.23 | 3.24 | 3.24 |
| | | (% of theoretical density) | (97) | (97) | (98) | (98) | (98) |
| | | Three-point bending strength (kg/mm²) | 95 | 99 | 105 | | |
| | Abrasive wearing of mold | | no | | | | |
| | Others | | Clogging occurred at pressure >50 kg/cm² | | | | |
| Mold Pressure (kg/cm²) | | | Si₃N₄—BN mold (Si₃N₄:BN = 70:30) | | | | |
| | | | 0 | 10 | 50 | 100 | 200 |
| Item of evaluation | Molded body | Mold-releasability | | | good | | |
| | | Bulk density (g/cm³) | 2.19 | 2.25 | 2.27 | 2.27 | 2.28 |
| | | (% of theoretical density) | (67) | (68) | (69) | (69) | (69) |
| | | Surface condition | | | good | | |
| | Sintered body | Bulk density (g/cm³) | 3.20 | 3.21 | 3.25 | 3.26 | 3.26 |
| | | (% of theoretical density) | (97) | (98) | (99) | (99) | (99) |
| | | Three-point bending strength (kg/mm²) | 100 | 102 | 110 | | |
| | Abrasive wearing of mold | | no | | | | |
| | Others | | no clogging | | | | |

Firing conditions: Si₃N₄, 1800° C., 9 kg/cm², in N₂

Industrial Applicability

According to the present invention, a mold for slip casting by far excellent as compared with conventional gypsum molds and resin molds can be obtained by using a mold constituted from boron nitride and other ceramic constituents. Further, molding of ceramic products and the like can be performed with good mold-releasability, without clogging and with high productivity by conducting slip casting using this mold.

That which is claimed is:

1. A mold for high pressure slip casting comprising boron nitride and at least one other ceramic constituent, said mold having air permeability, wherein:
   a weight proportion of boron nitride relative to a total weight of boron nitride and said at least one other ceramic constituent is 10 to 50%,
   an average pore diameter is 0.1 to 2 μm,
   a porosity is 10 to 40%, and
   a roughness represented by Ra of a wall surface of said mold is not larger than 3.0 μm.

2. A method for forming a ceramic product by slip casting comprising:
   preparing a slip casting mold comprising boron nitride and at least one other ceramic constituent, with an average pore diameter of 0.1 to 2 μm, a porosity of 10 to 40% and a roughness Ra of a wall surface of said slip casting mold not larger than 3.0 μm,
   preparing a slip of ceramic material,
   pouring said slip into said slip casting mold, and
   casting said slip to form said ceramic product by depositing said slip onto said wall surface of said slip casting mold.

* * * * *